US005137966A

United States Patent [19]

Nodelman

[11] Patent Number: 5,137,966

[45] Date of Patent: Aug. 11, 1992

[54] INTERNAL RELEASE AGENTS, ACTIVE HYDROGEN CONTAINING MIXTURES WHICH CONTAIN SUCH AGENTS AND THE USE THEREOF IN A PROCESS FOR THE PRODUCTION OF MOLDED PRODUCTS

[75] Inventor: Neil H. Nodelman, Pittsburgh, Pa.

[73] Assignee: Miles Inc., Pittsburgh, Pa.

[21] Appl. No.: 660,759

[22] Filed: Feb. 25, 1991

[51] Int. Cl.$^5$ .......................... C08K 5/09; C09F 5/08; C09F 7/10; C08G 18/06

[52] U.S. Cl. ...................................... 524/772; 528/44; 524/773; 554/163; 554/219; 554/223; 554/224; 554/227; 554/774

[58] Field of Search ................................ 524/773, 772; 260/410.6; 528/44

[56] References Cited

U.S. PATENT DOCUMENTS

| | | | |
|---|---|---|---|
| 3,925,527 | 12/1975 | Kleimann et al. | 264/53 |
| 4,201,847 | 5/1980 | Kleimann et al. | 521/172 |
| 4,254,228 | 3/1981 | Kleimann et al. | 521/128 |

*Primary Examiner*—Paul R. Michl
*Assistant Examiner*—Peter Sakely
*Attorney, Agent, or Firm*—Joseph C. Gil

[57] ABSTRACT

The present invention is directed to a novel internal mold release agent for use in a polyurethane(urea) RIM process. The release agent broadly consists of the transesterification product of a fatty acid and a lower alkyl acetoacetate.

5 Claims, No Drawings

INTERNAL RELEASE AGENTS, ACTIVE HYDROGEN CONTAINING MIXTURES WHICH CONTAIN SUCH AGENTS AND THE USE THEREOF IN A PROCESS FOR THE PRODUCTION OF MOLDED PRODUCTS

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester.

U.S. Pat. No. 3,925,527 describes an internal mold release which is the reaction product of a fatty acid ester and an organic monoisocyanate.

While these types of internal release agents have met with some success, neither is totally satisfactory for many applications. Two shortcomings of all internal release agents to date, including those described above, are i) the inability to release from a bare metal mold, such as steel or aluminum, and ii) the incompatibility of such agents with other additives typically used in the reaction injection molding ("RIM") process.

DESCRIPTION OF THE INVENTION

The present invention is directed to a novel internal mold release agent comprising the transesterification product of 1) a fatty acid polyester (i) having an OH number of from about 50 to about 550, preferably from about 50 to about 300, and most preferably from about 50 to about 200, (ii) having an acid number of 10 or less, preferably 5 or less, and most preferably less than 1, and 2) a lower alkyl acetoacetate, preferably in a ratio of one mole of acetoacetate per hydroxyl group of the fatty acid polyester.

It has been found that this particular combination of materials gives excellent release from a variety of different mold surfaces. Excellent release occurs when the mold surface has been pre-sprayed with an external release agent. It has also been found that release from a bare metal mold, such as steel or aluminum, is possible without any pre-application of external mold release agent to the mold surface.

The release agents herein are compatible with active hydrogen containing mixtures which are typically used in the preparation of reaction injection molded ("RIM") parts. Accordingly, the present invention is also directed to an active hydrogen containing mixture comprising:

A) an isocyanate reactive material containing at least two isocyanate reactive groups and having a molecular weight of from about 400 to about 10,000, B) from about 5 to about 50% by weight, based on the amount of component A), of a chain-extender having at least two isocyanate reactive groups, and, C) from about 0.5 to about 10% by weight, based upon the combined weight of components A) and B) of an internal mold release agent comprising the transesterification product of 1) a fatty acid polyester (i) having an OH number of from about 50 to about 550, preferably from about 50 to about 300, and most preferably from about 50 to about 200, (ii) having an acid number of 10 or less preferably 5 or less, and most preferably less than 1, and 2) a lower alkyl acetoacetate, preferably in a ratio of one mole of acetoacetate per hydroxyl group of the fatty acid polyester.

Finally the present invention is directed to an improved process for preparing a molded product by reacting an isocyanate with an isocyanate-reactive material in a mold, the improvement wherein the reaction mixture contains the internal release agent of the present invention.

The fatty acid esters useful herein (i) have OH numbers of from about 50 to about 550, preferably from about 50 to about 300, and most preferably from about 50 to about 200, (ii) have acid numbers of 10 or less, preferably 5 or less, and most preferably less than 1.

As used herein, the term "fatty acid" is defined as an acid containing one or more alkyl groups of from 8 to 22 carbon atoms. Useful fatty acids include both saturated and unsaturated carboxylic acids. Preferred are aliphatic fatty acids such as octane carboxylic acids, dodecane acids, natural fatty acids such as ricinoleic acid, oleic acid, alaidic acid, stearic acid, isostearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, dodecanoic acid, undecanoic acid, neodecanoic acid, adipic acid or higher dicarboxylic and polycarboxylic acids, oligomerization products of unsaturated carboxylic acids ("dimer acids") and addition products of maleic acid with natural and synthetic oils, and the like. The presently preferred acid is oleic acid.

The fatty acid esters used can be prepared by esterifying carboxylic acids with relatively low molecular weight diols, triols and/or polyols. By "relatively low molecular weight" is meant a molecular weight of less than about 500. Suitable low molecular weight diols, triols and polyols include ethylene glycol, propylene glycol, butanediols, hexanediols, glycerol, trimethylolpropane, pentaerythritol, addition products of alkylene oxides such as ethylene oxide or propylene oxide with the above noted alcohols, with amines such as ethylene diamine, and the like. Pentaerythritol is presently the most preferred alcohol used to prepare the polyesters herein.

Preparation of the fatty acid esters is most suitably carried out by the condensation of the diol, triol and/or polyol and acid at temperatures above 100° C., preferably at 120° C. to 240° C., optionally in a vacuum, the process of the elimination of water being continued until the desired hydroxyl and acid numbers have been obtained. The process of esterification may, of course, be catalyzed with acid or basic catalysts and the water may be eliminated by azeotropic distillation. The products prepared and used according to the invention contain predominant amounts of hydroxyl groups and may contain small amounts of carboxylic acid groups.

General techniques for the preparation of the fatty acid esters of the type useful herein are generally known and are described in U.S. Pat. Nos. 4,201,847, 4,254,228, and 3,925,527, the disclosures of which are herein incorporated by reference.

The fatty acid ester is then transesterified with a lower alkyl acetoacetate. In general, the transesterification reaction is conducted at temperatures ranging form 100° to 210° C. for periods of time ranging from 2 to 8 hours. If desired, transesterification catalysts, such as dibutyltin oxide and tetrabutyl titanate, can be used. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the transesterified product herein, transesterification catalysts may be necessary. In preparing the product, it is generally preferred that the reactants be used in amount such that one OH group is present for each acetoacetate group. However, it is also possible to use excess amounts of either reactant. In fact, in some cases it is preferred to use an excess of the acetoacetate to ensure complete reaction.

The release agents of the present invention are eminently suitable for use in the RIM process. As is known, in the RIM process, an isocyanate, and active hydrogen containing compounds are mixed and injected into molds, where the reactants are allowed to react fully. The release agents herein are typically used in amounts of from about 0.5 to about 10% by weight based upon the total weight of all the active hydrogen containing materials.

Starting polyisocyanate components for use in the RIM process include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers. HeX8hydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures () 3o of these isomers are also suitable in the instant invention. Diphenylmethane-2,4- and/or -4,4'-diisocyanate; naphthylene-1,5 -diisocyanate; triphenyl methane-4,4',4''-triisocyanate; polyphenyl polymethylene polyisocyanates of the type obtained by condensing aniline with formaldehyde, followed by phosgenation and described, for example, in British Pat. Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift 1,157,601 (U.S. Pat. No. 3,277,138); polyisocyanates containing carbodiimide groups of the type described in German Pat. No. 1,902,007 (U.S. Pat. No. 3,152,162); diisocyanates of the type described in U.S. Pat. No. 3,492,330; and polyisocyanates containing allophanate groups of the type described, for o example, in British Pat. No. 993,890, in Belgian Pat. No. 761,626 and in published Dutch patent application N0. 7,102,524 are still further examples of suitable isocyanates. Additionally, polyisocyanates containing isocyanurate groups of the type described, for example, in U.S. Pat. No. 3,001,973; in German Pat. Nos. 1,022,789; 1,222,067 and 1,027,394 and in German Offenlegungsschriften Nos. 1,929,034 and 2,004,408; polyisocyanates containing urethane groups of the type described, for example, in Belgian Pat. No. 752,261 or in U.S. Pat. No. 3,394,164; polyisocyanates containing acylated urea groups according to German Pat. No. 1,230,778 and polyisocyanates containing biuret groups of the type described, for example, in German Pat. No. 1,101,394 (U.S. Pat. Nos. 3,124,605 and 3,201,372) and in British Pat. No. 889,050 are also suitable.

Polyisocyanates produced by telomerization reactions of the type described, for example, in U.S. Pat. No. 3,654,106; polyisocyanates containing ester groups of the type described for example, in British Pat. Nos. 965,474 and 1,072,956, in U.S. Pat. No. 3,567,763 and in German Pat. No. 1,231,688; reaction products of the above-mentioned isocyanates with acetals o according to German Pat. No. 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Pat. No. 1,618,380 (U.S. Pat. No. 3,644,457). These may be produced for example, by reacting 1 mol of 4,4'-diisocyanatodiphenylmethane with from 0.05 to 0.3 moles of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Pat. No. 1,092,007 (U.S. Pat. No. 3.152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate. o Also necessary for preparing molded products via the RIM process are isocyanate reactive components. These components may be typically divided into two groups, relatively high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the o terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Pat. No. 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid o anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

So-called "aminopolyethers"may be used in accordance with the present invention as high molecular weight compounds (the molecular weight is always the average molecular weight ±5 which may be calculated from the functionality and the content of isocyanate-reactive groups). Such aminopolyethers include those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (Belgian Pat. No. 634,741). U.S. Pat. No. 3,654,370 describes the production of polyoxyalkylene polyamines by reaction of the corresponding polyol with ammonia and hydrogen in the presence of a nickel, copper, chromium catalyst. German Pat. No. 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Pat. No. 1,551,605. The production of polyethers containing terminal secondary amino groups is described, for example, in French Pat. No. 1,466,708.

Polyhydroxypolyethers of relatively high molecular weight may be converted into the corresponding anthranilic acid esters by reaction with isatoic acid anhydride, as described, for example, in German Offenlegungschriften Nos. 2,019,432 and 2,619,840 and in U.S. Pat. Nos. 3,808,250, 3,975,428 and 4,016,143. Polyethers containing terminal aromatic amino groups are formed in this way.

According to German Offenlegungschrift No. 2,546,536 and U.S. Pat. No. 3,865,791, relatively high molecular weight compounds containing terminal amino groups are obtained by reaction of isocyanate terminated prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with German Offenlegungschrift No. 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

Also useful are amino compounds prepared by reacting the corresponding polyol with a halogenated nitrobenzene compound such as o- or p-nitrochlorobenzene, followed by the reduction of the nitro group(s) to the amine as described in U.S. application Ser. No. 183,556, filed on Apr. 19, 1988, and in published European application No. 0,268,849, published Jun. 1, 1988. Also useful are amino compounds prepared by reacting an amine with an acetoacetlated polyol as described in U.S. application Ser. Nos. 523,769 (filed on May 15, 1990), 524,268 (filed on May 15, 1990), and 562,293 (filed on Aug. 3, 1990).

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with from about 5 to about 50% by weight based on the quantity of the high molecular weight active hydrogen containing compound, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl2,4-diamino benzene, 1-methyl-3,5-diethyl-2,6-diamino benzene, 1,3,5-trimethyl-2,4 -diamino benzene, 1,3,5-triethyl-2,4-diamino benzene, 3,5,3',5'-tetraethyl-4,4'-diamino diphenylmethane, 3,5,3',5'- tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl -2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'-and/or 4,4'-diaminodiphenylmethane, 1,2- and 1,4-phenylene diamine, naphthalene-1,5-diamine and triphenylmethane-4,4'4"-triamine. The difunctional and polyfunctional aromatic amine compounds may also exclusively or partly contain secondary amino groups such as 4,4'-di-(methylamino) -diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Other additives which may be used in the RIM process according to the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo -(2,2,2)-octane (triethylene diamine), especially mixtures of these catalysts. The catalysts are generally used in amounts of about 0.01 to 10%, preferably about 0.05 to 2%, based on the weight of the isocyanate reactive component. In some instances, such as where the compatibilizer contains tertiary amine groups, no additional catalyst may be necessary.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included. According to the present invention, the internal release agent is added to the isocyanate reactive components.

The invention is further illustrated but is not intended to be limited by the following examples in which all parts and percentages are by weight unless otherwise specified.

EXAMPLES

Polyester 1

5440 parts of oleic acid was charged into a 12 liter, 3-necked flask fitted with a thermometer, an overhead stirrer and a packed distillation column. The contents were stirred under nitrogen and heated to 100° C. 1100 parts of pentaerythritol and 464 parts of adipic acid were then charged to the flask and mixed with the oleic acid. The temperature was then increased. At 160° C., water began to distill over. The temperature was increased to 215° C. at which time approximately 80% of the theoretical (464 parts) amount of water had distilled over. Vacuum was then applied to strip off the remaining water (at <4 mm Hg.). The total cycle time was about 8 hours. The resultant polyester had i) an OH number of about 51, ii) an acid number of less than 4, iii) a water content of less that 0.1%, and iv) a viscosity at 25° C. of about 350 mPa.s.

Polyester 2

The identical procedure was used to produce a second polyester from 2500 parts of oleic acid, 627 parts of pentaerythritol, and 328 parts of adipic acid (theoretical water distilled over was 243 parts). The resultant polyester had an OH number of about 73 and an acid number of about 2.

Internal Release Agent A ("IMR A")

7000 parts of POLYESTER A and 1158 parts of t-butylacetoacetate (representing a 15% excess) were charged to a 12 liter flask and heated to 200° C. under nitrogen. 470 parts of t-butyl alcohol were distilled off. The reaction mixture was cooled to 115° C., and vacuum was then applied to remove excess t-butylacetoacetate.

Internal Release Agent B ("IMR B")

Using the identical procedure, IMR B was produced from 2700 parts of POLYESTER B, and 769 parts of t-butylacetoacetate with 281 parts of t-butyl alcohol being distilled off.

RIM Examples

In the RIM examples which follow, the following materials were used:

POLYOL A: a glycerine initiated poly(propylene oxide/ethylene oxide) product having an OH number of 28, and having ethylene oxide termination (about 83% by weight propylene oxide and 17% by weight ethylene oxide).

DETDA: an 80/20 mixture of 1-methyl-3,5-diethyl-2,4- and -2,6-diaminobenzene.

TEDA: triethylenediamine, Dabco 33LV, available from Air Products

DBTDL: dibutyltin dilaurate

ISO: a tripropylene glycol/4,4'-methylenebis(phenyl isocyanate) adduct having an NCO content of about 23%.

RIM plaques were prepared using a laboratory piston metering unit and clamping unit. The metering unit was a two component instrument having a maximum metering capacity of 0.6 liters. A rectangular mold, 300 mm × 200 mm × 4 mm was used to mold the samples. The mold was first stripped with a mold cleaner (N-methyl pyrrolidinone), then soaped (with Chemtrend 2006, available from Chemtrend) and then buffed twice. An aluminum transducer plate (2.2 inch radius) was connected to a force transducer mounted in the lid of the mold. The plate was soaked in DMF for an hour, polished with fine steel wool, rinsed with water, and then rinsed with acetone. A RIM shot was then made, and at the appropriate demold time, the lid of the mold is opened slowly. The maximum force required to pull the transducer plate from the molded plaque is the release force. The lower the number, the easier the release.

The following molding conditions were used:

Mold Temperature: 65° C.

Component B temp: 45° C.

Component A temp: 45° C.

Demold time: 45 seconds

The following three formulations were used:

| | Example | | |
|---|---|---|---|
| | 1 | 2 | 3 |
| Component B | | | |
| POLYOL A | 71.8 | 71.8 | 71.8 |
| DETDA | 20 | 20 | 20 |
| IMR A | 8 | — | — |
| IMR B | — | 8 | — |
| POLYESTER A | — | — | 8 |
| TEDA | 0.1 | 0.1 | 0.1 |
| DBTDL | 0.1 | 0.1 | 0.1 |
| Component A | 52.3 | 52.3 | 52.3 |
| ISO (index = 105) | | | |

In the case of Example 1, 17 shots were made, with the average release force being 58 newtons. In the case of Example 2, 15 shots were made, with the average release force being 68 newtons. Finally, in the case of Example 3, only 5 shots were made, with the average release force being 790 newtons. In fact, for the fifth shot the force required was in excess of 1000 newtons.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A novel internal mold release agent comprising the transesterification product of
   1) a fatty acid polyester (i) having an OH number of from about 50 to about 550, and (ii) having an acid number of 10 or less, and
   2) a lower alkyl acetoacetate.

2. The release agent of claim 1, wherein said fatty acid polyester has i) an OH number of from about 50 to about 300, and ii) an acid number of 5 or less.

3. The release agent of claim 1, wherein said fatty acid polyester has i) an OH number of from about 50 to about 200, and ii) an acid number of less than 1.

4. An active hydrogen containing mixture comprising:
   A) an isocyanate reactive material containing at least two isocyanate reactive groups and having a molecular weight of from about 400 to about 10,000,
   B) from about 5 to about 50% by weight, based on the amount of component A), of a chain-extender having at least two isocyanate reactive groups, and,
   C) from about 0.5 to about 10% by weight, based upon the combined weight of components A) and B) of an internal mold release agent comprising the transesterification product of
      1) a fatty acid polyester (i) having an OH number of from about 50 to about 550,and (ii) having an acid number of 10 or less, and
      2) a lower alkyl acetoacetate.

5. In a process for preparing a molded product by reacting an isocyanate with an isocyanate-reactive material in a mold, the improvement wherein the reaction mixture contains internal mold release agent comprising the transesterification product of
   1) a fatty acid polyester (i) having an OH number of from about 50 to about 550,and (ii) having an acid number of 10 or less, and
   2) a lower alkyl acetoacetate.

* * * * *